United States Patent [19]
Percy

[11] 3,859,620
[45] Jan. 7, 1975

[54] HYDROPHONE LINE ARRAY CALIBRATION UNIT

[75] Inventor: Joseph L. Percy, San Diego, Calif.

[73] Assignee: The United States of America as represented by the Secretary of the Navy, Washington, D.C.

[22] Filed: Jan. 23, 1974

[21] Appl. No.: 435,912

[52] U.S. Cl.............. 340/5 C, 73/10 V, 324/79 R, 181/112
[51] Int. Cl.......................................... H04r 29/00
[58] Field of Search............ 340/5 C; 73/1 B, 10 V, 73/4 R, DIG. 1, DIG. 2, DIG. 4; 181/110, 112; 324/79 R, 80

[56] References Cited
UNITED STATES PATENTS
| | | | |
|---|---|---|---|
| 3,713,084 | 1/1973 | Mayne et al. | 340/7 R |
| 3,740,707 | 6/1973 | O'Brien et al. | 340/5 C |

OTHER PUBLICATIONS
Howatt et al., "Hardware... and Calibration of Hydrophanes," 6/62, pp. 27-28, Undersea Technology, Vol. 3.

Primary Examiner—Maynard R. Wilbur
Assistant Examiner—N. Moskowitz
Attorney, Agent, or Firm—Richard S. Sciascia; Erwin F. Johnston; Thomas Glenn Keough

[57] ABSTRACT

An elongate hydrophone array is simultaneously calibrated to ensure the monitoring of accurate, meaningful readings when the invention is subsequently deployed. A cylindrically-shaped wire-mesh framework serves as a support for the array and a number of tie lines secure the array on the framework in a helically extending relationship. A coaxially disposed projector of acoustic energy ensonifies the helically coiled hydrophone array and an adjacent reference hydrophone. The reference hydrophone and the hydrophone array are coupled to monitoring circuits which provide a relationship of the reference signals and the array signals to allow a calibration of the array.

7 Claims, 3 Drawing Figures

HYDROPHONE LINE ARRAY CALIBRATION UNIT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Passive detection devices and in particular hydrophones have been in use for some time. When a single transducer element is so employed, the interconnected circuitry and associated electronics need not be overly complicated to attain an acceptable degree of detection capability. However, when several or a goodly number of transducers are so used to give a directional or beam forming capability, all the transducer elements should functionally cooperate.

For this reason calibration of the transducers is essential. Calibration of point sources, omnidirectional hydrophones, speakers and microphones to produce a value called the receiving response is not overly difficult. This is largely because the dimensions of these elements are relatively small to enable their calibration by receiving and by appropriately processing signals which originate from a near-by projector of acoustic energy. However, this technique usually fails when the receiving response of a line array is to be determined.

A line array usually stretches over several hundred feet. Spaced along its length are a number of hydrophones fabricated from piezoelectric or ferroelectric elements. Conventionally the line arrays are typlified as being either functionally linear or tapered. A linear line array has an equidistant spacing between adjacent hydrophone elements and a tapered line array has different spacings between adjacent hydrophone elements to located a node, or a phase center, at a predetermined point along the array. Irrespective of which mode of operation is selected, the array's length presents a common problem during calibration.

There must be a sufficient separation between the array and the transmitting source such that the ensonifying acoustic signal from a projector of acoustic energy arrives in phase at all the hydrophone elements simultaneously. At high frequencies (multiples of 10 times kiloHertz) the separation between the array and the projector can be relatively small so that calibration is made in a large tank. However, at low frequencies the calibration requires that the separation must be performed over many miles of open ocean where the receiving array and the transmitting transducer are both located at a proper depth in isothermal water (being so disposed the transmitted acoustic signals are not interfered with by multi-path arrivals).

Heretofore, the prior art has depended on such a long range calibration technique and requiring that the array was spaced far from the projector of acoustic energy. This space or range is given by the equation:

$$R > L^2/\lambda \quad (1)$$

where R is the separation or range between the array and the projector of ensonifying energy, where L is the length of the array and where $\lambda$ is the wave length of the transmitted signal.

This equation can be better expressed as $$R > c(n-1)^2/4 \cdot f/f_0^2 \quad (2)$$

for a linear array having $\eta$ transducer elements with spacings of $\lambda o/2$ from which we have used $f_o = c/\lambda o$ as the maximum operating frequency and where f represents the operating frequency.

Equation (2) was used to devise a representative table with the number of transducer elements $n = 11$, $c = 1$ mile/second, and $f = f_o$. Thus, for the calibration range R to be sufficient for calibrating this line array at frequencies ranging from one to 100 kiloHertz the following values are obtained:

| $f_o$ (Hertz) | 1 | 10 | 100 | 1K | 10K | 100K |
|---|---|---|---|---|---|---|
| R (miles) | 25 | 2.5 | $2.5 \times 10^{-1}$ | $2.5 \times 10^{-2}$ | $2.5 \times 10^{-3}$ | $2.5 \times 10^{-4}$ |
| R (feet) | $1.3 \times 10^5$ | $1.3 \times 10^4$ | $1.3 \times 10^3$ | $1.3 \times 10^2$ | $1.3 \times 10^1$ | 1.3 |

Thus, from the foregoing it is obvious that at low frequencies, those frequencies less than 100 Hertz, line arrays can not be accurately calibrated with existing facilities.

SUMMARY OF THE INVENTION

The present invention is directed to providing an apparatus for permitting the calibration of an elongate hydrophone array. A cylindrically shaped supporting member is fabricated from a wire mesh and nonconductive securing devices mount the elongate hydrophone array on the inner surface of the mesh in a helical fashion. An adjacent reference hydrophone and the helically extending elongate hydrophone array are ensonified by a projector of acoustic energy. Suitable monitoring circuitry is interconnected to the reference hydrophone and the hydrophone array to ensure a representative calibration of the array.

The prime object of the invention is to provide a means for calibrating an elongate transducer array.

Another object is to provide a transducer array calibrator which enables the calibration of an elongate array in a compact space.

Another object of the present invention is to provide an array calibrator which reduces the possibility of reflected signals from interfering with the array calibration.

Yet another object is to provide an apparatus for allowing the transport of an elongate hydrophone array.

A further object of the invention is to provide an apparatus for permitting the calibration of an elongate transducer array which is inexpensive and of high reliability.

Still another object is to provide an apparatus which allows the use of conventional facilities for calibrating an elongate array.

These and other objects of the invention will become more readily apparent from the ensuing description when taken with the drawings.

BRIEF DESCRIPTION OF THE DRAWINGS

FIG. 1 is an isometric depiction of the invention with

DESCRIPTION OF THE PREFERRED EMBODIMENT

Figure 1:
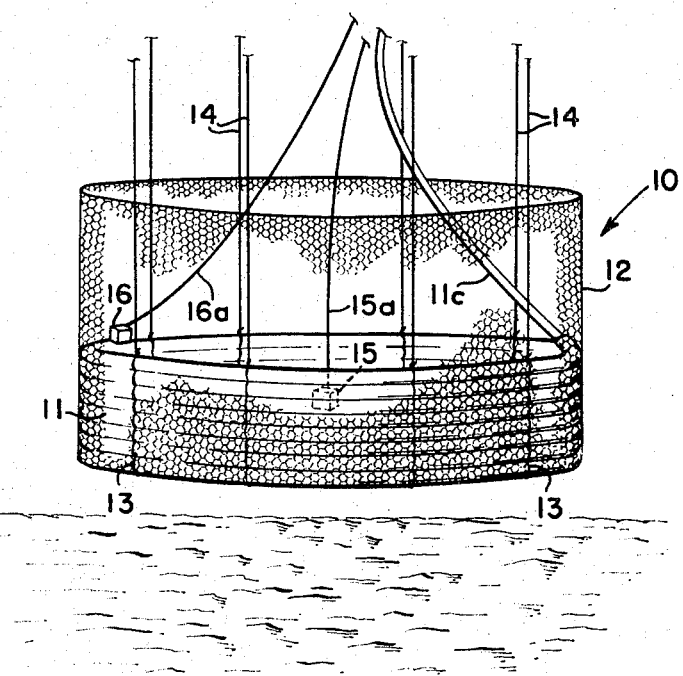
Figure 3:
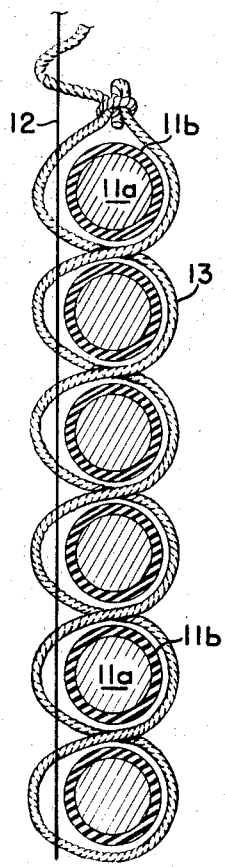
FIG. 3 is a detail of the invention taken generally along lines 3—3 in FIG. 2.
Figure 2:
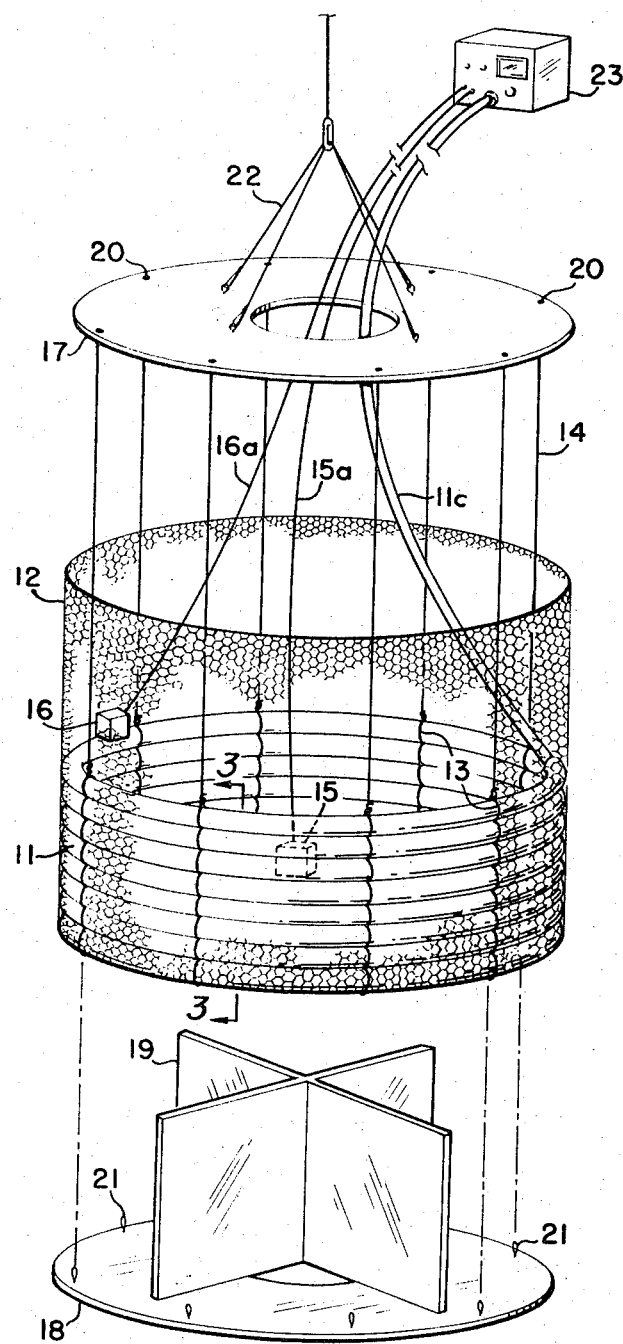
FIG. 2 is an exploded view of the invention.

Referring now to the drawings, there is shown a representative embodiment of a calibration unit 10 just prior to its being immersed in an acoustically nonreflective tank. An elongate hydrophone array 11 is mounted in place for purposes of calibration.

The array is optionally any one of a variety of towed hose-shaped arrays used to monitor a distant source of signals. Usually the array includes a number of spaced piezoelectric or ferroelectric cylinders 11a covered by a flexible hose-shaped sheath 11b which collectively functions as a hydrophone. The cylinders optionally are electrically interconnected in parallel or in series or other electrical arrangements and are equidistantly spaced or not depending on whether the linear or tapered mode of operation is desired. Irrespective of what type of array is to be calibrated, this invention serves to facilitate its calibration.

In its most expeditious form for enhancing reliability, the unit is formed from a section a wire mesh into a cylindrically-shaped framework 12. A limp fabric has been interwoven like a fish net and has been used with some degree of success. Yet, a semirigid woven wire or chicken wire framework has been found to work better, since the wire's degree of rigidity tends to hold the line array apart in a circular orientation. Although the exact material is not overly critical, the mesh-shaped design makes the framework transparent to acoustic energy and the problems associated with reflections in the array are avoided. That is to say, if the cylindrically shaped framework were a solid shell undesireable reflections of acoustic energy would be generated during calibration. Using the preferred mesh design allows the ensonifying acoustic energy to pass through the framework in a manner which will be elaborated on below.

A number of tie lines 13 are wrapped about the array and secure the array on the framework in a helically extending relationship. The tie lines are selected from a nonmetallic fabric and, thusly, do not interfere with the calibration process.

Lowering of the array after it is secured to the framework is accomplished by several support lines 14. Several support lines 14 of equal length are coupled to the framework along its circumference and for this reason the support lines optionally are extensions of the equidistantly spaced tie lines. In either event the support lines are substantially constructed to bear the weight of the array and framework when the array is lowered into and raised from a test tank.

For the purposes of calibration and after the array has been lowered into an acoustically nonreflective test tank, a coaxially disposed projector of acoustic energy 15 ensonifies the array over a frequency range extending from 10 Hertz to 1 kiloHertz. A reference hydrophone 16 is mounted on the inside of the cylindrically shaped mesh and, along with the array is ensonified. It is desireable to select a reference hydrophone having a receiving response which is substantially identical to the hydrophone elements being calibrated in the array. Reference hydrophone leads 16a and array leads 11c reach to remote monitoring circuitry 23 where a comparison is made between the signals generated by the reference hydrophone and by the array.

Calibration of an elongate array which normally extends over a considerable distance is a simple matter by reason of the present invention. The array is tied onto the framework as described above and is lowered into an acoustically nonreflective test tank by the support lines.

Since the array is arranged in a spiral, ensonifying energy from projector 15 reaches the entire array and reference hydrophone 16 at the same phase and amplitude. The ensonifying energy spans a frequency range of 10 Hertz to 1 kiloHertz, and leads 11c, and 16a pass representative signals to monitoring circuitry 23. In one form, the monitoring circuitry is no more than an oscilloscope from which a visual indication of the relationship of the reference hydrophone signals to the array signals is obtained. In the alternative more sophisticated circuitry is included to enhance the calibration process.

Provision is made for giving the calibration unit a transport capability by the inclusion of a disc-shaped top 17 and a similarly shaped bottom 18. A spacer 19 in the form of a pair of orthogonally disposed rigid elements is interposed between the top and bottom and serves to prevent the crushing of the array as it is being moved from one location to another. When the top and bottom discs are used, appropriately disposed holes, 20 pass the support lines and several hook fasteners 21 are carried on the upper surface of the bottom disc to allow the interconnection of the bottom disc to the mesh framework. After the support lines have been fed through the holes, the lines are knotted to secure the framework to the top disc. A lifting harness 22 is mounted on the upper surface of the top disc to allow the relocation of the entire unit.

Obviously, many modifications and variations of the present invention are possible in the light of the above teachings, and, it is therefore understood that within the scope of the disclosed inventive concept, the invention may be practiced otherwise than specifically described.

I claim:

1. An apparatus for permitting the calibration of an elongate hydrophone array comprising:
    means for cylindrically supporting said elongate hydrophone array on its inner surface in a helically extending configuration;
    means disposed adjacent said elongate hydrophone array for providing reference signals;
    means coaxially mounted in the cylindrically supporting means for ensonifying the helically extending said elongate hydrophone array and the providing means with signals; and
    means coupled to said helically extending said elongate hydrophone array for monitoring the ensonified signals and the reference signals to allow said calibration.

2. An apparatus according to claim 1 in which said cylindrically supporting means is a semirigid conductive material for holding said elongate hydrophone array in its helical configuration and said apparatus further includes:
    means for securing said elongate hydrophone array on said cylindrically supporting means.

3. An apparatus according to claim 2 in which the securing means is a nonconductive material to avoid interference with said calibration 4. An apparatus according to claim 3 in which the conductive cylindrically supporting means has a mesh-like construction to reduce reflections of the ensonifying signals and to render the apparatus substantially neutrally buoyant when immersed in water.

5. An apparatus according to claim 4 further including:
means connected to said conductive cylindrically supporting means for suspending said helically extending said elongate hydrophone array in a body of water during said calibration.

6. An apparatus according to claim 5 further having a transport capability and further including;
means disposed at opposite ends of said conductive cylindrically supporting means for protecting said helically extending said elongate hydrophone array and
means interposed between portions of the protecting means for spacing said portions to avoid damaging said helically extending said elongate hydrophone array.

7. An apparatus according to claim 6 further including:
means coupled to the protecting means for lifting said helically extending said elongate hydrophone array for relocation.

* * * * *